(12) United States Patent
Riley et al.

(10) Patent No.: US 8,182,228 B2
(45) Date of Patent: May 22, 2012

(54) TURBINE BLADE HAVING MIDSPAN SHROUD WITH RECESSED WEAR PAD AND METHODS FOR MANUFACTURE

(75) Inventors: Shawn P. Riley, Cincinnati, OH (US); Kazim Ozbaysal, Cincinnati, OH (US); Paul Stuart Wilson, New Richmond, OH (US); David Edwin Budiner, Loveland, OH (US)

(73) Assignee: General Electric Company, Schenectady, NY (US)

( * ) Notice: Subject to any disclaimer, the term of this patent is extended or adjusted under 35 U.S.C. 154(b) by 1105 days.

(21) Appl. No.: 11/839,629

(22) Filed: Aug. 16, 2007

(65) Prior Publication Data

US 2009/0047132 A1    Feb. 19, 2009

(51) Int. Cl.
*F01D 5/22* (2006.01)
(52) U.S. Cl. ............ 416/193 R; 416/194; 416/196 R; 416/224; 29/889.7
(58) Field of Classification Search ........ 416/190, 416/191, 193 R, 194, 195, 196 R, 223 A, 416/244 A, 224, 500; 29/889.7
See application file for complete search history.

(56) References Cited

U.S. PATENT DOCUMENTS

| | | | | |
|---|---|---|---|---|
| 3,576,377 A * | 4/1971 | Beanland et al. | ............ | 416/191 |
| 4,257,741 A * | 3/1981 | Betts et al. | ............ | 416/190 |
| 4,690,876 A * | 9/1987 | Mizuhara | ............ | 428/606 |
| 5,083,903 A * | 1/1992 | Erdmann | ............ | 416/190 |
| 5,460,488 A | 10/1995 | Spear et al. | | |
| 6,164,916 A * | 12/2000 | Frost et al. | ............ | 416/189 |
| 7,001,152 B2 * | 2/2006 | Paquet et al. | ............ | 416/190 |
| 2007/0068992 A1 | 3/2007 | Ozbaysal et al. | | |
| 2007/0154338 A1 * | 7/2007 | Sathian et al. | ............ | 419/5 |
| 2008/0047138 A1 * | 2/2008 | Milleville | ............ | 29/889.2 |
| 2008/0145207 A1 * | 6/2008 | Mohr et al. | ............ | 415/173.1 |

OTHER PUBLICATIONS

CF6 Presentation, Athen, Greece, Nov. 2006, GE Aviation.

* cited by examiner

*Primary Examiner* — Edward Look
*Assistant Examiner* — Jesse Prager
(74) *Attorney, Agent, or Firm* — William Scott Andes; Gary M. Hartman; Domenica N.S. Hartman

(57) ABSTRACT

A durable blade, a method of manufacturing it and a method of repairing blades are described and claimed. Durable blade includes an airfoil having a pressure side and a suction side, a midspan shroud located on the airfoil, at least one recess on the midspan shroud and a wear pad attached to the recess of the midspan shroud.

12 Claims, 6 Drawing Sheets

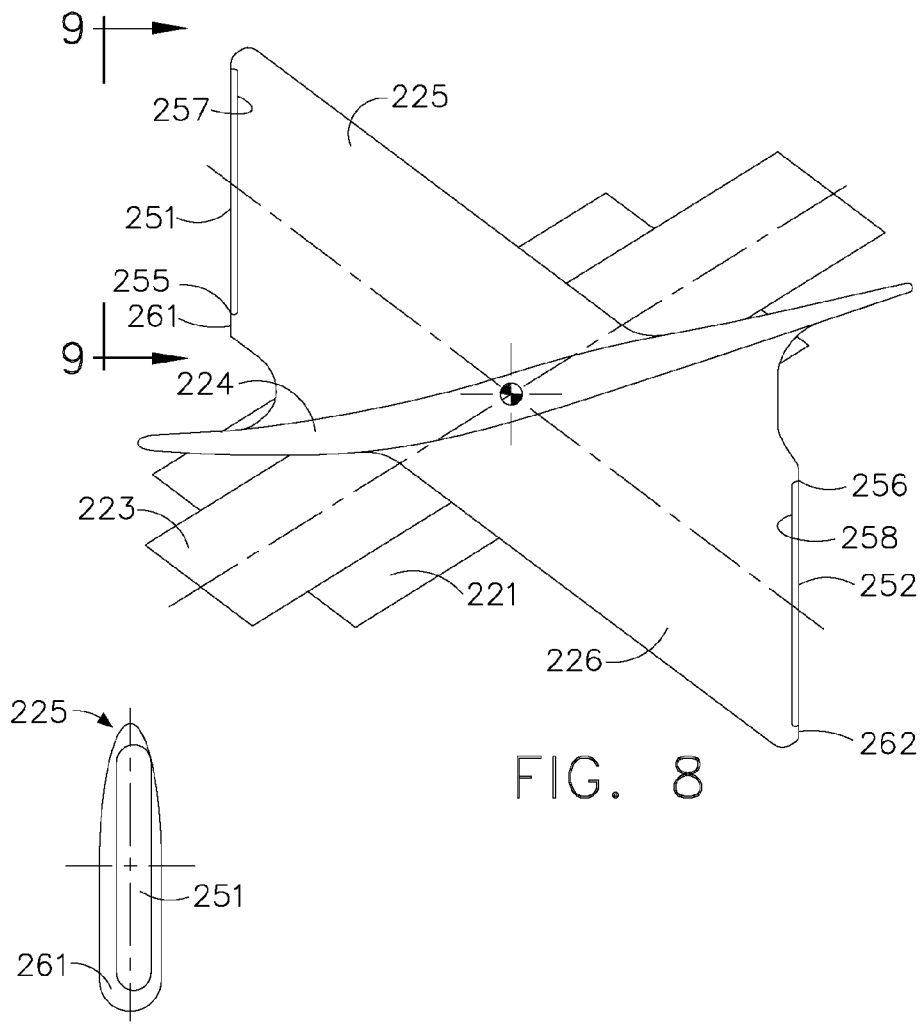
FIG. 8
FIG. 9
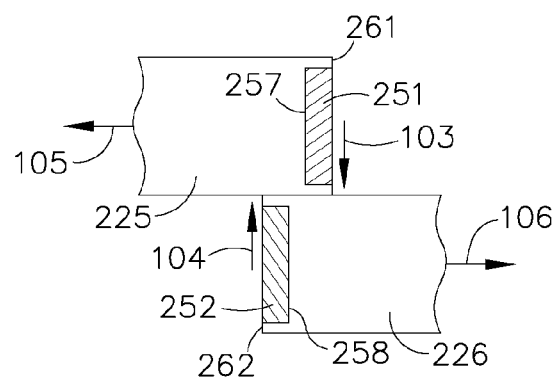
FIG. 10

TURBINE BLADE HAVING MIDSPAN SHROUD WITH RECESSED WEAR PAD AND METHODS FOR MANUFACTURE

BACKGROUND OF THE INVENTION

This invention relates generally to turbine engines, and more specifically to blades used in axial compression systems.

In a gas turbine engine, air is pressurized in a compression module during operation. The air channeled through the compression module is mixed with fuel in a combustor and ignited, generating hot combustion gases which flow through turbine stages that extract energy therefrom for powering the fan and compressor rotors and generating engine thrust to propel an aircraft in flight or to power a load, such as an electrical generator.

The compression system includes a rotor assembly comprising a plurality of rotor blades extending radially outward from a disk. More specifically, each rotor blade has a dovetail which engages with the disk, a platform forming a part of the flow path, and an airfoil extending radially from the platform to a tip. The platform may be made integral to the blade or, alternatively, made separately.

In some designs, the rotor blade, especially those in a fan rotor and the front stages of a multistage compression system, have a pair of circumferentially extending shrouds on the airfoil, one projecting from the pressure surface and one projecting from the suction surface. The shrouds are located at a radial location between the blade dovetail and the blade tip. In some other designs, the shrouds may be located at the tip of the blade airfoil. During normal operation of the compression system, the blades twist and the shrouds on adjacent blades contact with each other, forming a shroud ring that provides support to the blades. During engine operation, the shroud ring resists vibration and twisting of the blades. The term "midspan shroud" is used herein to refer to all supports on fan and compression system blades that contact with each other during operation, and includes all supports located anywhere on the span of the blade, including supports at the tip of the blade. The "midspan shrouds", as used herein, may be located anywhere along the blade span, not just at the midpoint of the span.

During certain abnormal events, such as a bird impact, other foreign object impact, or stalls during engine operation, the normal contact between the shrouds of adjacent blades is disturbed. The contact forces become high and misaligned due to the impacts and the shrouds become disengaged fully or partially. This is called "shingling" of the blades. Shingling causes significant wear and tear damage on the midspan shrouds. When the speed of the compressor rotor drops, the shingled blades may rebound, causing further wear and tear on the shrouds.

Conventional blades sometimes have wear pads brazed on the contact faces on the midspan shrouds. Wear pads 51, 52, such as shown in FIG. 4 have been used in conventional blades 24 to address the wear problem. For example, some compressor blades made from Titanium contain a brazed on WC—Co wear pad to prevent adhesive wear between two rubbing Ti-6Al-4V midspan shrouds. The wear pads are conventionally brazed to the titanium blade using a titanium-copper-nickel (TiCuNi) alloy braze foils. Diffusion occurs between TiCuNi braze foil and WC—Co wear pad during high temperature braze. Titanium forms brittle compounds with the alloying elements of the wear pad in the braze joint. As a result, the braze joint achieves high hardness, loses ductility and may not be able to withstand impact and tear type failures. TiCuNi braze foil has been found to lack ductility for impact and tear type failures during a shingling event. Conventional pad/braze systems such as shown in FIGS. 4, 5 and 6 (items 51, 52, 53, 54) are unable to sustain pulling loads 105, 106 and rubbing loads 103, 104 on the exposed pad edges that occur when the blades rebound from a shingling event. Both this type of loading and impact damage result in significant loss of wear pad 51, 52 material from the midspan shroud surface and require servicing to restore the wear resistance to the blades.

It is desirable to have a durable blade with wear pads that resist impact and tear type of damage, and further resist such damage when the compression system blades rebound from shingling. It is desirable to have manufacturing methods to apply the wear pads and brazing in such a way that the blades are durable. It is desirable to have repair methods to apply the durable wear pads to blades that have been used in service.

BRIEF DESCRIPTION OF THE INVENTION

The above-mentioned needs may be met by exemplary embodiments with at least one recess on the midspan shroud and a wear pad attached into the recess of the midspan shroud.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 8 is a planar view of a portion of an exemplary compressor blade with recessed wear pads on the midspan shrouds.

FIG. 9 is a side view of the recessed wear pad on the mid span shroud shown in FIG. 8.

FIG. 10 is a schematic sketch of the midspan shrouds of two adjacent exemplary compressor blades with recessed wear pads in a shingled condition.

DETAILED DESCRIPTION OF THE INVENTION

Figure 1:
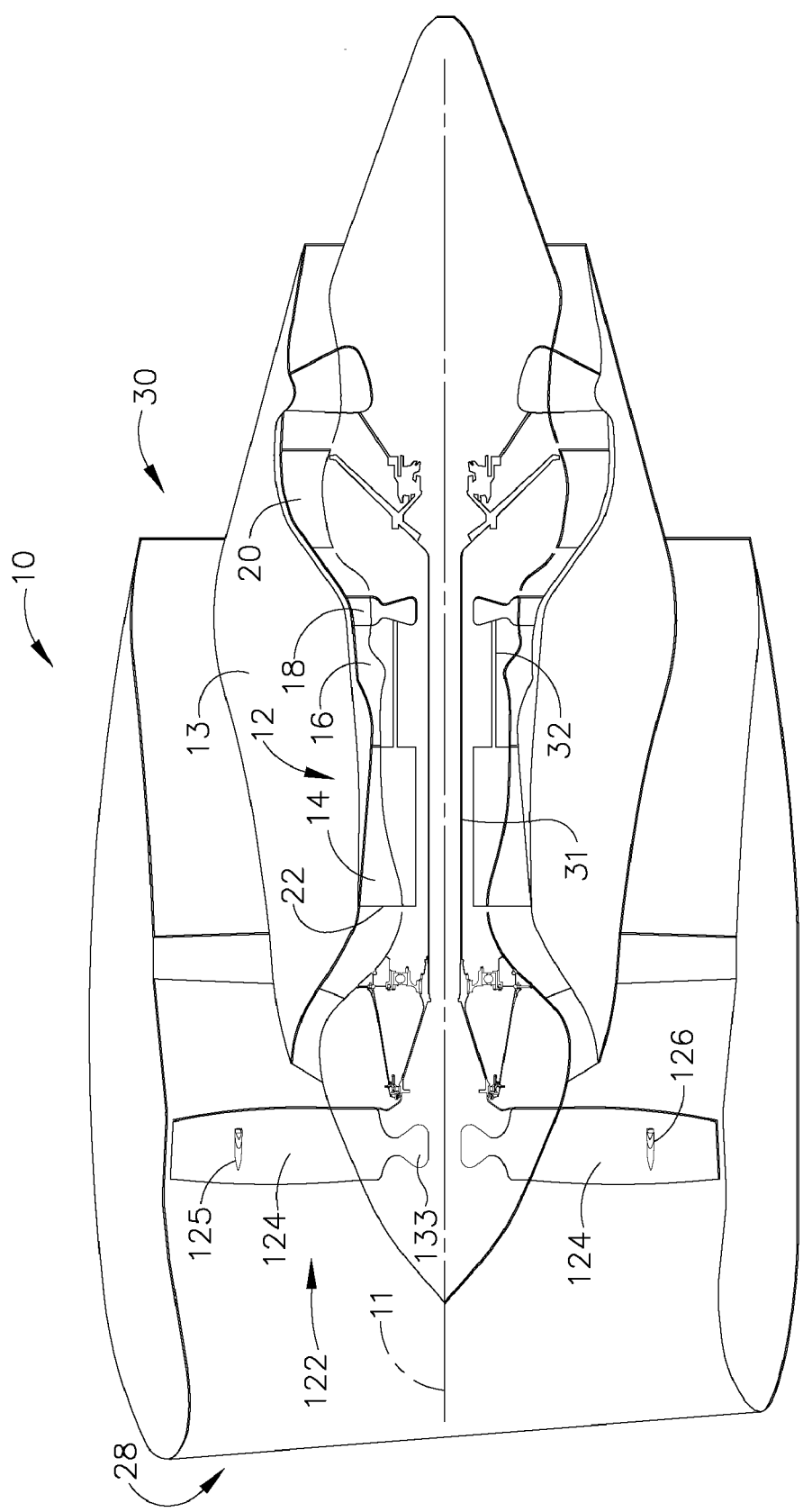
FIG. 1 is a cross-sectional view of an exemplary gas turbine engine assembly.
Figure 2:
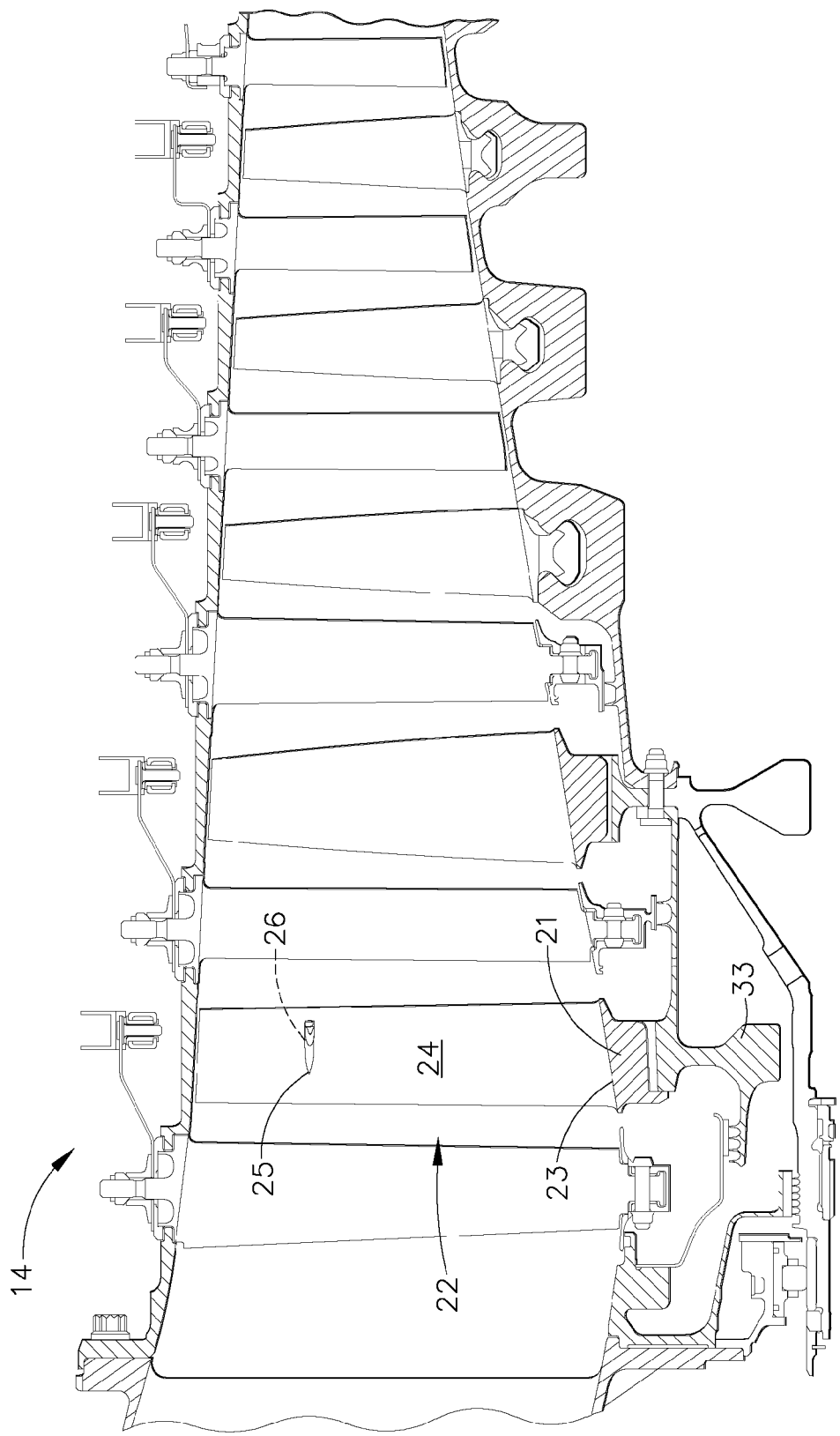
FIG. 2 is an exemplary compressor used in a gas turbine engine.

Referring to the drawings wherein identical reference numerals denote the same elements throughout the various views, FIG. 1 shows a cross-sectional view of a gas turbine engine assembly 10 having a longitudinal axis 11. The gas turbine engine assembly 10 includes a core gas turbine engine 12 that includes a high-pressure compressor 14, a combustor 16, and a high-pressure turbine 18. In the exemplary embodiment shown in FIG. 1, the gas turbine engine assembly 10 also includes a low-pressure turbine 20 that is coupled axially downstream from core gas turbine engine 12, and a fan assembly 122 that is coupled axially upstream from core gas turbine engine 12. Fan assembly 122 includes an array of fan blades 124 that extend radially outward from a rotor disk 133. The fan blades have midspan shrouds 125, 126 located between the root and the tip of the airfoil. The midspan shrouds 125, 126 extend circumferentially from the pressure and suction sides of the airfoil. FIG. 2 shows an exemplary compressor assembly 22 used in turbofan engines. The compressor assembly 22 includes an array of compressor blades 24 extending radially outward from a rotor disk 33. The front stage compressor blades, such as the stage 1 compressor blade 24 shown in FIG. 2, may have midspan shrouds 25, 26 extending circumferentially from the pressure and suction sides of the airfoil. In the exemplary embodiment shown in FIG. 1, engine 10 has an intake side 28 and an exhaust side 30. In the exemplary embodiment, gas turbine engine assembly 10 is a turbofan gas turbine engine that is available from General Electric Company, Cincinnati, Ohio. Core gas turbine engine 12, fan assembly 122, and low-pressure turbine 20 are coupled together by a first rotor shaft 31, and compressor 14 and high-pressure turbine 18 are coupled together by a second rotor shaft 32.

In operation, air flows through fan assembly blades 24 and compressed air is supplied to high pressure compressor 14. The air discharged from fan assembly 122 is channeled to compressor 14 wherein the airflow is further compressed and channeled to combustor 16. Products of combustion from combustor 16 are utilized to drive turbines 18 and 20, and turbine 20 drives fan assembly 122 via shaft 31. Engine 10 is operable at a range of operating conditions between design operating conditions and off-design operating conditions.

Figure 3:
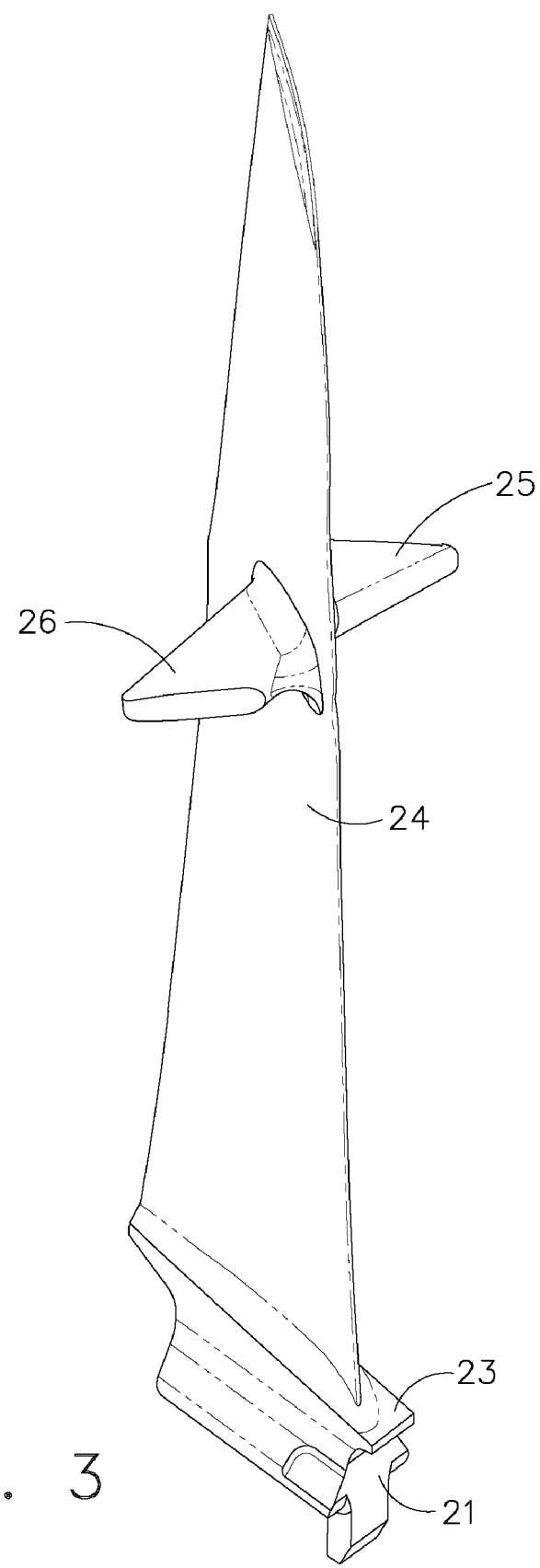
FIG. 3 is a conventional compressor blade used in a gas turbine engine.
Figure 5:
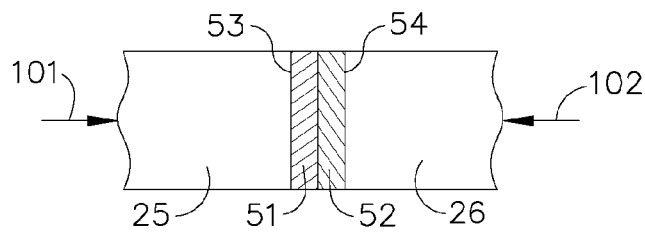
FIG. 5 is a schematic sketch of the midspan shrouds of two adjacent conventional compressor blades in contact in typical operation.

FIG. 3 shows a stage 1 compressor blade 24 having an airfoil, dovetail 21, a platform 23 and a midspan shroud 25 on the suction side and a midspan shroud 26 on the pressure side. In fan and compressor rotor assemblies, the blades 24 are arranged in the circumferential direction around a disk. As explained previously, during engine operation, the blades airfoils twist, and the midspan shroud 25 on the suction side of a blade 24 comes into contact with the midspan shroud 26 on the pressure side of the adjacent blade 24. The shrouds 25 and 26, when thus engaged with each other, form a stiff ring supporting the blades 24 to prevent vibration. FIG. 5 shows schematically the contact region between the wear pads 51, 52 of the shrouds 25, 26 of two adjacent blades and the forces 101 and 102 exerted by the shrouds 25, 26. As the engine shuts down the shrouds 25, 26 disengage. As the engines operate through many cycles, the contact faces of the wear pads 51, 52 are subjected to significant wear and tear.

Figure 4:
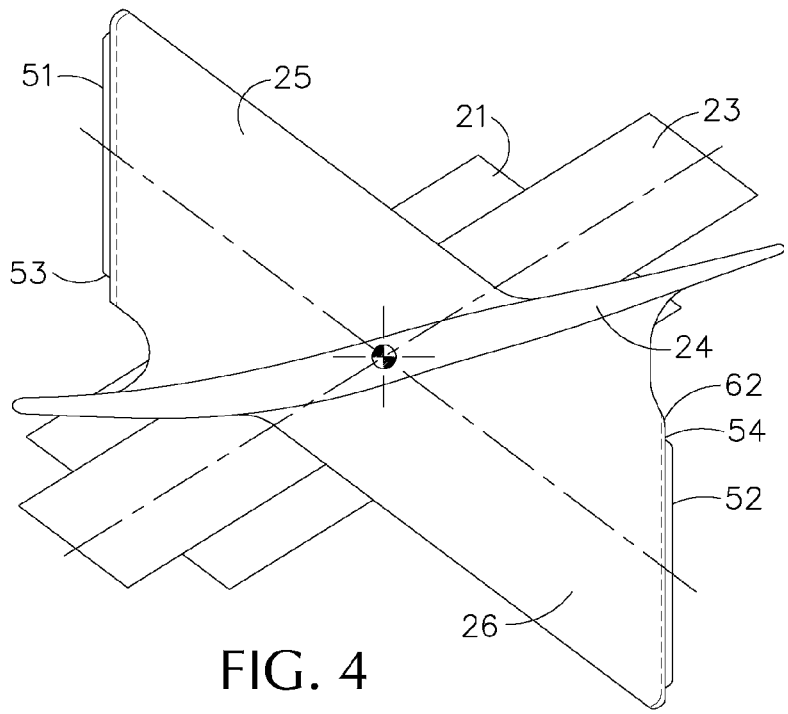
FIG. 4 is a planar view of a portion of a compressor blade with a conventional wear pad on the midspan shroud.
Figure 6:
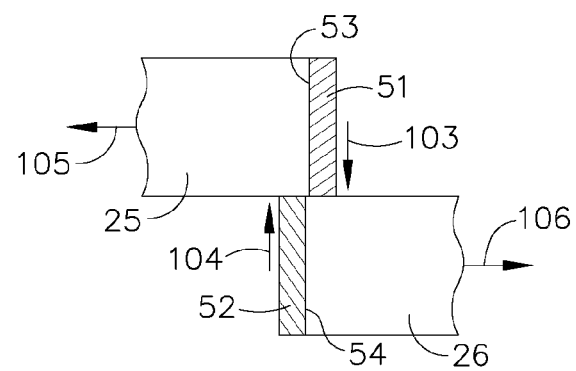
FIG. 6 is a schematic sketch of midspan shrouds of two adjacent conventional compressor blades in a shingled condition.

Moreover, during shingling events, such as due to bird impact or other unusual loading events, the contact forces between the adjacent midspan shrouds 25, 26 and their orientations are changed such that the midspan shrouds 25, 26 become disengaged, resulting in shingling. This is schematically shown in FIG. 6. During continued operation of the engine, the shingled midspan shrouds 25, 26 bounce back into normal contact with each other. This bounce back happens, for example, due to engine speed changes or due to other aeromechanical forces. The midspan shrouds 25, 26 experience rubbing forces (103, 104) and tearing forces (105, 106) during the bounceback. These rubbing and tearing forces cause very significant wear and tear on the conventional midspan shrouds 25, 26 represented in FIGS. 4, 5 and 6.

A preferred embodiment of the invention is shown in FIG. 8. In the preferred embodiment, TiCuNi braze foil is replaced with a gold-based braze alloy of composition 47% Au-43% Cu-10% Ni by wt % (AuCuNi). Elimination of Ti from the braze foil reduces the formation of brittle TiC and TixCoy intermetallic compounds in the braze joint and increases ductility. AuCuNi braze foil is softer than currently used TiCuNi alloy after braze, with better shear strength and equivalent corrosion properties. Brazing temperature is 1750 F-1900 F and braze duration is 1-3 minutes.

In the preferred embodiment of FIG. 8, the softer AuCuNi foil reduces braze interface separations. As explained previously in reference to the conventional midspan shrouds 25, 26 of FIGS. 4 through 6, the side pull and tear damage to the wear pads 51, 52 is very significant when shingled midspan shrouds rebound. It has been seen that such a failure of the wear pads 51, 52 is a cohesive failure (within the wear pads 51, 52) rather than adhesive (in the interface). In the preferred embodiment of a blade 224 shown in FIG. 8, to prevent cohesive failure of wear pads 251, 252 of a pair of midspan shrouds 225, 226 due to tear during a shingling event, each wear pad 251, 252 is brazed into a recess 257, 258 in each face 261, 262 on the midspan shrouds 225, 226 so that the contact surface of each wear pad 251, 252 is surrounded by and flush with the face 261, 262 of its corresponding midspan shroud 225, 226, such as shown, for example, in FIGS. 7, 8, 9 and 10. A portion of the shroud face 261, 262 shields its recessed wear pad 251, 252 from the adjacent midspan shroud pull loads 105, 106 and rub loads 103, 104 during a shingling/rebound event (as schematically shown in FIG. 10) and edge-related tear failures are reduced. It has been found that pull and tear action of the adjacent midspan shroud 225, 226 is more damaging than a head on impact sustained by the wear pad 251, 252 during shingling. AuCuNi braze alloy is more resistant to head on impact failures than TiCuNi braze foil due to its ductility. With the recessed design, such as shown in FIG. 8, the edges of the wear pad 251, 252 are protected from the tearing action of the adjacent midspan shroud, thus increasing the durability of the blade 224.

Figure 7:
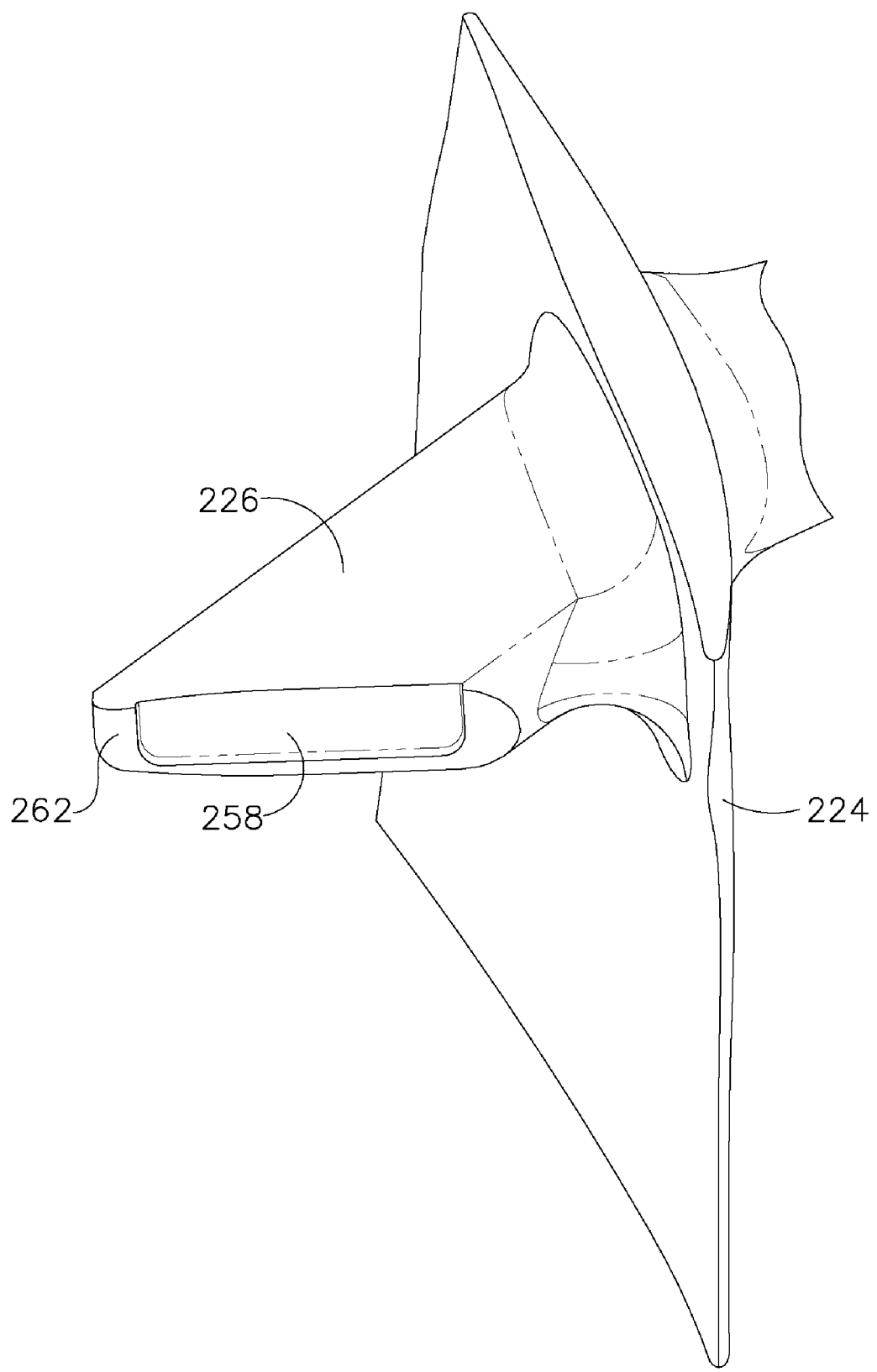
FIG. 7 is a perspective view of an exemplary compressor blade with a recess on a midspan shroud face during manufacture.

A durable blade 224 is made by forming a recess 257, 258 on the midspan shroud 225, 226 face 261, 262 using conventional means such as machining. FIG. 7 shows the preferred embodiment of a recess 258 that is formed on a compressor blade 224 midspan shroud 226 face 262. The recessed wear pad 251, 252 can be incorporated on new blades 224 as a part of the new blade manufacturing process.

The recessed wear pad 251, 252 can be used to repair blades that have been used in service in order to improve their durability. For blades that have been used in service, the repair process involves several steps comprising: removal of any existing wear pad by a suitable method such as a chemical or mechanical method, machining the midspan shroud, cleaning and inspection, building up the midspan shroud by welding if necessary, blending any weld build up by machining, heat treating, forming a recess 257, 258 on the face 261, 262 of the shroud 225, 226 such as shown in FIG. 7, applying new wear pads 251, 252 by brazing it in the recess 257, 258, inspecting the braze by a suitable means, such as by ultrasonic inspection or by X-ray. Blade dovetail coatings and peening are applied where necessary.

In the preferred embodiments of the durable blade, its manufacturing method and the repair method, AuCuNi foil 255, 256 of thickness 1-3 mils is placed into a previously formed recessed groove 257, 258 of a Ti-6Al-4V blade midspan shroud 225, 226. The WC—Co wear pad 251, 252 is placed on top of the braze foil 255, 256. The blade 224 is placed into a vacuum chamber for induction brazing. The midspan shroud 225, 226 is placed into the induction coil. AC current passes through the coil and generates a magnetic field in the midspan shroud which generates eddy currents in the shroud which rapidly increases the temperature to brazing range. Brazing temperature is 1750-1900 F. Duration for the braze is about 1-3 minutes. Vacuum used is about 10^−5 torr.

In alternative embodiments of the present invention, other wear pad materials and braze foils may be used in recesses formed in the midspan shroud contact faces 261, 262 using the teachings herein. It is possible to use the wear pads 251, 252 on only certain selected regions of the contact faces 261, 262. It is also possible to apply the teachings herein to other locations on the blades which may experience shingling, such as for example, blade platforms and tip shrouds.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A blade for mounting with other blades in a circumferential direction around a disk, the blade comprising:
    an airfoil having a pressure side and a suction side;
    a pair of midspan shrouds located on the airfoil, each shroud having a planar contact face, the contact faces facing in opposite circumferential directions of the blade, wherein one midspan shroud extends in the circumferential direction from the pressure side and the other midspan shroud extends in the circumferential direction from the suction side;
    at least one recess on each of the contact faces of the midspan shrouds so that each recess is surrounded by one of the contact faces of a corresponding one of the midspan shrouds; and
    a wear pad disposed within each recess of the midspan shrouds, each wear pad having a contact surface that is surrounded by the contact face of the corresponding midspan shroud so that a portion of the corresponding contact face shields the wear pad from pull loads and rub loads during a shingling/rebound event with a midspan shroud of a second blade mounted circumferentially adjacent to the blade on a disk.

2. A blade according to claim 1 wherein each wear pad is made from an alloy comprising Tungsten Carbide (WC) and Cobalt (Co).

3. A blade according to claim 1 wherein each wear pad is attached to the midspan shroud by brazing.

4. A blade according to claim 3 wherein the brazing is performed using a braze alloy comprising titanium-copper-nickel (TiCuNi).

5. A blade according to claim 3 wherein the brazing is performed using a gold based braze alloy comprising 47% Au, 43% Cu, 10% Ni by weight.

6. A method of manufacturing a blade comprising the steps of:
    forming a blade having a midspan shroud,
    forming a recess on a planar contact face on the midspan shroud so that the recess is surrounded by the contact face,
    inserting a braze alloy into the recess,
    inserting a wear pad into the recess having the braze alloy,
    attaching the wear pad to the blade by brazing, the wear pad having a contact surface that is surrounded by the contact face of the midspan shroud, and
    installing the blade with other blades in a circumferential direction around a disk, wherein a portion of the contact face shields the wear pad from pull loads and rub loads during a shingling/rebound event with a midspan shroud of a second blade mounted circumferentially adjacent to the blade on the disk.

7. A method according to claim 6 wherein the wear pad comprises an alloy having Tungsten Carbide (WC) and Cobalt (Co).

8. A method according to claim 6 wherein the braze alloy comprises titanium, copper and nickel (TiCuNi).

9. A method according to claim 6 the braze alloy comprises a gold based alloy.

10. A method according to claim 9 wherein the gold based alloy comprises 47% Au, 43% Cu, 10% Ni by weight.

11. A method according to claim 6 wherein the brazing is performed between about 1750 F and about 1900 F.

12. A method according to claim 11 wherein the brazing is performed in vacuum.

* * * * *

UNITED STATES PATENT AND TRADEMARK OFFICE
CERTIFICATE OF CORRECTION

PATENT NO.        : 8,182,228 B2
APPLICATION NO.   : 11/839629
DATED             : May 22, 2012
INVENTOR(S)       : Shawn P. Riley et al.

Page 1 of 1

It is certified that error appears in the above-identified patent and that said Letters Patent is hereby corrected as shown below:

On the cover page at (75): David Edwin "Budiner" is David Edwin -- Budinger --.

Signed and Sealed this
Twenty-sixth Day of June, 2012

David J. Kappos
*Director of the United States Patent and Trademark Office*